R. S. SMITH.
CROSS BAR BLANKING PRESS.
APPLICATION FILED APR. 7, 1919.

1,357,357.

Patented Nov. 2, 1920.
6 SHEETS—SHEET 1.

Fig. 1.

INVENTOR
REUBEN STANLEY SMITH.
BY
Erwin, Wheeler & Woolard
ATTORNEYS.

R. S. SMITH.
CROSS BAR BLANKING PRESS.
APPLICATION FILED APR. 7, 1919.

1,357,357.

Patented Nov. 2, 1920.
6 SHEETS—SHEET 4.

INVENTOR
REUBEN STANLEY SMITH

BY
Erwin, Wheeler & Woolard
ATTORNEYS.

R. S. SMITH.
CROSS BAR BLANKING PRESS.
APPLICATION FILED APR. 7, 1919.

1,357,357.

Patented Nov. 2, 1920.
6 SHEETS—SHEET 5.

Fig. 10.

WITNESSES:

INVENTOR
REUBEN STANLEY SMITH

BY
Erwin, Wheeler & Woolard
ATTORNEY

R. S. SMITH.
CROSS BAR BLANKING PRESS.
APPLICATION FILED APR. 7, 1919.

1,357,357.

Patented Nov. 2, 1920.
6 SHEETS—SHEET 6.

INVENTOR
REUBEN STANLEY SMITH

BY
Erwin, Wheeler & Woolard
ATTORNEYS.

UNITED STATES PATENT OFFICE.

REUBEN STANLEY SMITH, OF MILWAUKEE, WISCONSIN.

CROSS-BAR-BLANKING PRESS.

1,357,357.  Specification of Letters Patent.  Patented Nov. 2, 1920.

Application filed April 7, 1919. Serial No. 288,083.

*To all whom it may concern:*

Be it known that I, REUBEN STANLEY SMITH, a citizen of the United States, of Milwaukee, in the county of Milwaukee and State of Wisconsin, have invented a certain new and useful Improvement in Cross-Bar-Blanking Presses, and do hereby declare that the following is a full, clear, and exact description thereof, such as will enable persons skilled in the art to which the invention pertains to make and use the same, reference being had to the drawings hereto attached for disclosure as to certain details of construction and arrangement.

This invention relates to presses for use in the production of sheet metal blanks which subsequently are to be shaped so as to form the cross bars of motor vehicle frames.

The machine embodying this my present invention is designed to form an element of the assemblage of machines disclosed in my application Serial No. 212,934, filed Jan. 21, 1918, such assemblage including machines which by their related and successive operations, punch from metal plates or sheets the side and cross bar and other blanks used in constructing an automobile or other vehicle frame, shape such blanks according to the particular requirements relating to each, perform the necessary milling operations thereon, assemble the several constituent parts, and secure all of such parts in their respective positions by means of rivets, so that in a continuous operation of mechanical devices a completed automobile or other vehicle frame is automatically produced.

My invention resides in a blanking press having novel means for feeding into the press sheet metal plates from which the cross bar blanks are punched, such feeding means being intermitting in its action, and controlled as to its feeding movement by feeler devices rendered operative by the presence of a plate in proper position to be fed to the press.

Feeler devices operating in conjuction with the blanking press serve to ascertain whether the sheet metal plate then being fed to the press has been advanced to its correct position, and also whether there remains in the sheet sufficient material to form another blank. If not, the operation of the punching means is suspended for the time being, or until the plate is properly positioned or another one fed between the punching dies.

The invention also resides in the combination with a blanking press of the character referred to, of a cutting press by the operation of which the skeleton remaining in the sheet metal plate after the blanking operations, is reduced to "scrap" in a state not requiring further treatment, and is carried from the press to a place of storage by mechanical devices.

Devices are provided also for delivering the completed cross bar blanks from the press after the blanking operations have been completed.

Other devices are provided for delivering from the press the usable scrap, as destinguished from the scrap in general, such usable scrap being of such superficial are as to be suitable for conversion into smaller blanks and parts.

Other details of my invention will appaer in the claims appended to this specification.

The invention will be more clearly understood by reference to the accompanying drawings, in which:—

Figure 2:
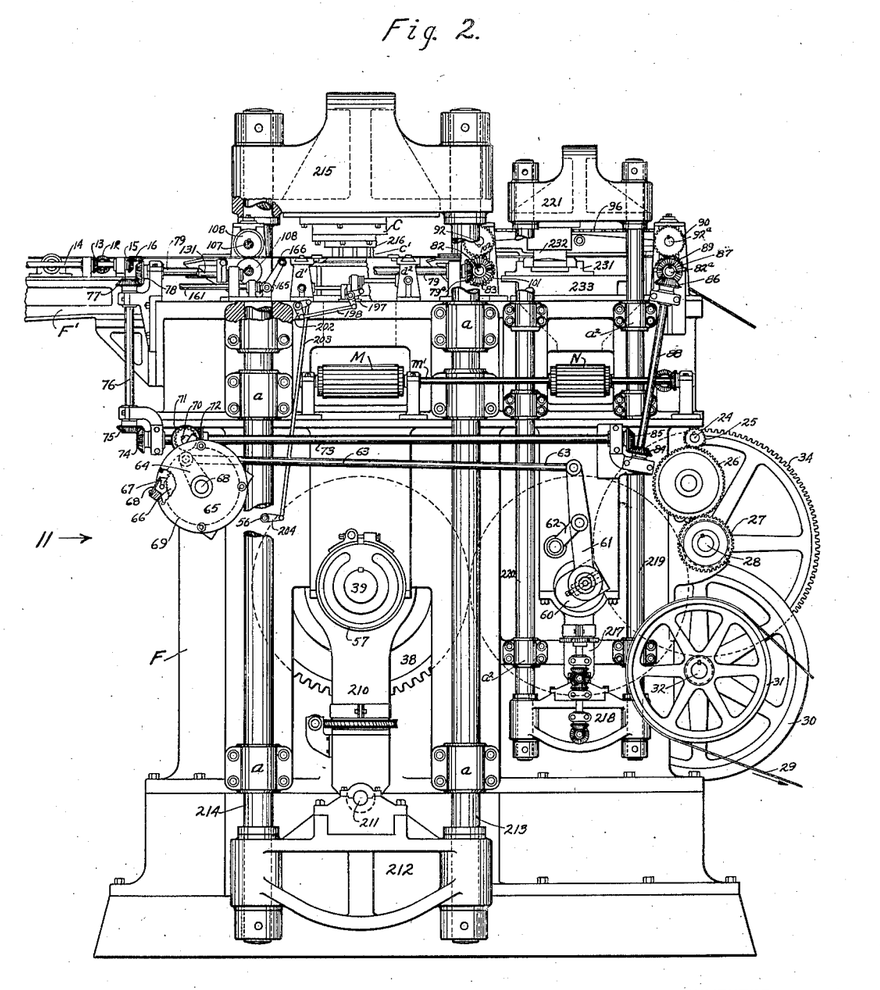
Fig. 2 is a view in elevation of the press at the upper right hand side of Fig. 1.
Figure 10:
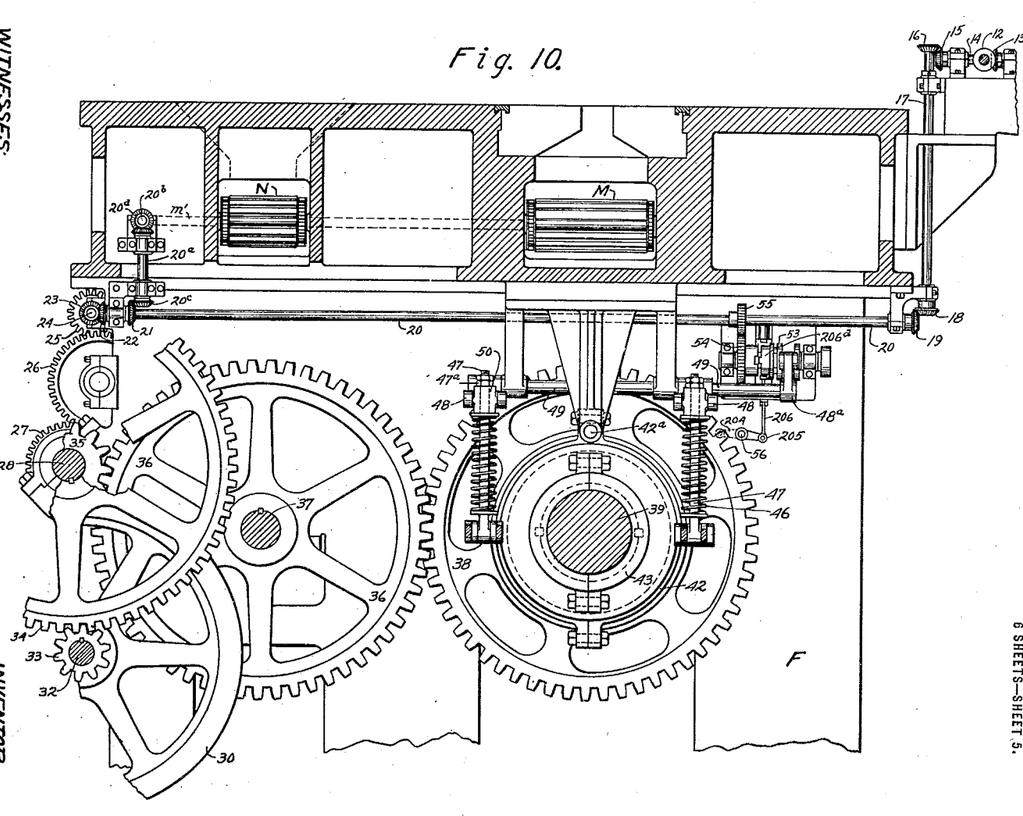
Fig. 10 is a longitudinal view in elevation, showing enlarged and partly in section, the arrangement of parts of the press, the view being taken upon the line 10—10 Fig. 11.

In the drawings, Figs. 2 and 10, the driving shaft 32, to which power is applied through the usual belt 29 and pulley 31, has mounted thereon a fly-wheel 30, and a pinion 33. The latter engages and drives a gear 34, keyed to the shaft 28, upon which is keyed also a pinion 35, meshing with a gear 36, on the cross shaft 37. A cross shaft 39 has loosely mounted thereon a gear 38, which meshes with the gear 37. The shafts mentioned are suitably journaled in the main frame F of the press.

The blanking press frame is composed of cross heads 212 and 215 united by straining rods 213 and 214 at each end of the press, as is usual in constructions of this kind. The shaft 39 is provided with eccentrics 209 which impart vertical reciprocation to the blanking press frame through connecting links 210, pivoted at 211 to the lower cross head 215. Guide boxes $a$ attached to the main frame F serve to guide the straining rods in the vertical movements of the blanking press frame.

The main frame F is provided with an extension $F^1$, upon which is mounted the devices for feeding the sheet metal plate A to the blanking press. This extension comprises two side frames $f$ and $f^1$, upon which a series of positively and continuously driven rollers 10 is mounted. These rollers, although constantly rotating, act but intermittingly to feed the metal sheet to the blanking press. The shafts of the rollers 10 are journaled in the side frames $f$, $f^1$, and each is provided at one end with a bevel gear 12 meshing with a like gear 13 mounted upon a driven line shaft 14, the latter being journaled in bearings on one of the side frames. A bevel gear 15 upon the end of the shaft 14 engages a like gear 16 upon the upper end of an inclined shaft 17, which latter is connected to shaft 20, extending rearwardly of the press, by bevel gears 18 and 19, upon the contiguous ends of the respective shafts.

Mounted also upon the hereinbefore mentioned power shaft 28, is a gear 27 in mesh with a gear 26, which in turn engages a gear 25, driving a shaft 24, carrying a bevel gear 23, in mesh with a like gear 22 upon the other end of the shaft 20. By the connections described, the feeding rollers 10, for feeding the metal plates to the blanking press are constantly rotated.

A second series of rollers 11, is mounted in the side frames $f$, $f^1$, and although revoluble in conjunction with the rollers 10 during the plate feeding movements of the latter, are idle so far as any driving means is concerned. The journals of the rollers 11, are mounted in eccentric bushings $11^a$, which oscillate in bearings in the said side frames. In their normal position, the rollers 11 lie with their upper surfaces in or slightly below the plane of the upper surfaces of the constantly rotating feeding rollers 10. By throwing their eccentric bearings $11^a$, the upper surfaces of the rollers 11 are raised to a plane above that of the upper surfaces of the rollers 10, and as a consequence the metal plate A resting upon all of the rollers 10 and 11, is elevated from its position of engagement with the rollers 10, and the feeding movement of the said plate is suspended for the time being. Each eccentric bearing is provided with an actuating arm 136, the free end of which is connected with a reciprocating rod 137. By reciprocating the rods 137, the series of rollers 11 is elevated and depressed, through connection of the arms 136 with the eccentric bearings $11^a$ thereof.

A third roller $11^b$, whose journals are eccentric to its axis, is mounted also in the side frames $f$, $f^1$. Crank arms 138 are fixed upon the roller $11^b$, and at their free ends are connected to the rods 137. A radial arm 139 is also fixed to the roller $11^b$, at a point between the crank arms 138. This arm 139 is connected by a link 140 to a crank 141, actuated by mechanism to be described at some later place in this specification. Rotation of the crank 141 oscillates the third roller $11^b$, through the radial arm 139, and through the crank arms 138, reciprocates the rods 137.

The construction of the roller $11^b$ differs from the rollers 10 and 11, in that a tubular sleeve $11^c$ is placed thereon, excepting at the points of attachment of the cranks 138 and arm 139. The said roller having the eccentric movement but not the rotary movement of the rollers 11, the sleeve is provided so as to obviate the friction on the surface of the roller, which would otherwise be caused to exist by the passage of the plate A thereover.

A fourth roller 100, arranged in order nearest to the blanking press is mounted by its journals in the frames $f$, $f^1$, and like the rollers 10, is similarly geared to the line driving shaft 14. Upon the right hand end of the roller 100, Fig. 3, a gear 120 is placed. This gear meshes with a gear 121 pivoted on the frame $f^1$, and carries a bevel gear 122, which engages a gear 123, fixed to a shaft 124, and carrying a cam 125. An anti-friction roller upon the nose of the cam engages and actuates a lever 127, pivoted to an arm formed as a part of the stand in which the shaft 124 is mounted. A link 128 connects the free end of the lever 127 with an arm 130, splined upon a rock shaft 131, mounted at one end in a bearing upon the slide 237, and an expansion spring 129, confined about the link 128, causes the lever 127 to follow its actuating cam, when the said lever is free for movement by the spring.

A second arm 132 is carried by the rock shaft 131, and is provided at its upper end with an anti-friction roller 133, which contacts with the underside of the plate A while the latter is being fed into the blanking press, by the several feed rollers which have been described.

At its other end the roller 100 has fixed thereon a gear 143, meshing with a gear 144, rotating freely upon the shaft of crank 141, mounted in the extension $f^2$, of frame $f$ and provided with a clutch face 145. Splined upon the crank shaft so as to rotate therewith but free for longitudinal movement thereon, is an intermittingly operated cam 147, having on one side a clutch face 146 opposed to and adapted for engagement with the clutch face 145, of the gear 144. Short spiral springs 147', socketed in the adjacent sides of cam 147, and the crank, tend to engage the clutch faces 145 and 146, and rotate the crank 141, to thus impart movement to the eccentrically mounted rollers 11 and $11^b$, to raise them to a plane above the surface of the feeding rollers 10, and to bring all of the rollers into the same plane at the desired intervals. The crank shaft is provided with a friction brake 142, of usual form, to prevent over-running of the crank 141. The feeding of the plate A is timed with the operation of the blanking press.

A slide 237 is movable longitudinally on slotted guides 250, and may be clamped in adjusted position. This slide has slotted upright standards $237^a$, thereon, and mounted in the slots are blocks $237^b$ receiving the journals of shafts 107 and $107^a$, to which are secured with provision for axial adjustment, the flanged guiding and feeding rolls 108. The rolls 108 are pressed into yielding engagement with the plate A, which passes between them, by the springs 109, which are regulated as to pressure by the adjusting screw shown in Fig. 5. The adjustment of the pressure will be such as to insure the forward movement of the plate A, by the grip of the rolls 108 thereon.

The slide 237 is moved longitudinally on its guides 250 by means of two screw threaded shafts 238 and 239, the free ends of which engage tapped holes in the slide. At their other ends the said shafts are journaled in the frame F, and are provided with bevel gears 242, 240, engaging like gears 243, 241 on the shaft 244, mounted to rotate in brackets on the frame, and turntable by a hand wheel 245.

Marginal guides 246 for the plates A, are adjustably secured to the frames $f$ and $f^1$. These guides have slotted arms 248, through which pass screws which are threaded into the said frames to hold the guides in the positions in which they have been adjusted, to insure correct alinement and feeding of the plates into the blanking press.

Figures 3, 4, 5, 12:
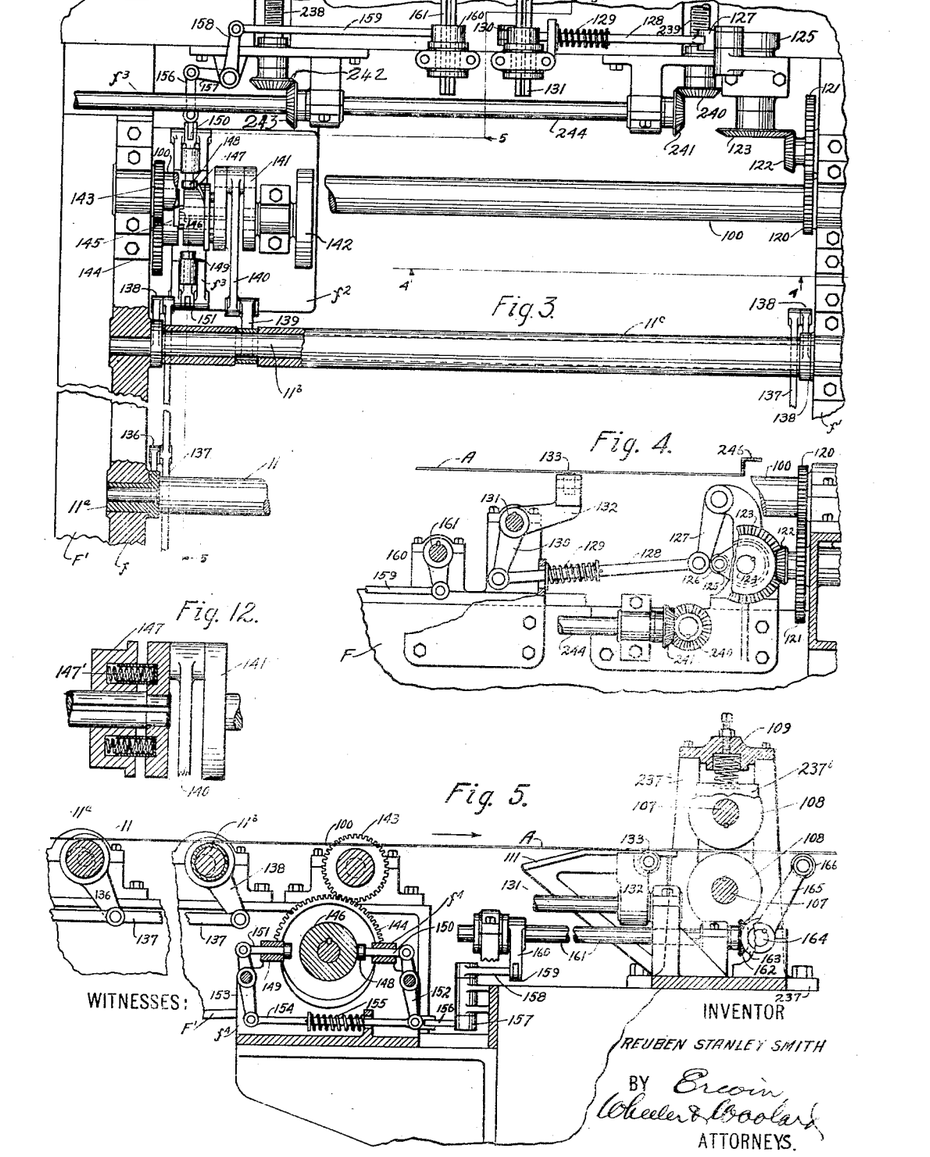
Fig. 3 is an enlarged plan and partly sectional view of parts in the plane of Fig. 1.
Fig. 4 is a fragmentary view in elevation of parts, on the line 4—4, Fig. 3, looking through the press.
Fig. 5 is a longitudinal sectional view on the line 5—5, Fig. 3, showing in elevation some details of the metal sheet feeding devices.
Fig. 12 is a sectional view showing the mounting of the sliding cam for transmitting motion to the feeding mechanism.

Guiding and supporting tables 111, having their forward edges inclined as shown in Fig. 5, are mounted on the slide 237. These tables are provided with supplemental guides 247, adjustable to and from each other in alinement with the guides 246, and coöperating with the guiding rolls 108 in directing the movement of the plates A.

When not depressed below the line of travel by the presence of a plate A, in its passage thereover, the anti-friction roller 133 of the arm 132, will be moved by the spring 129 so as to intercept such line of travel, and under such conditions the said roller and arm will act as a stop to the feeding movement of another plate until such time as the movements of the machine are in synchronism. The cam 125 will then withdraw the roller and arm from their elevated position and the feeding of the second plate will be commenced.

I have devised means to prevent the feeding at the same time of more than one plate A, should by any possibility the leading end of a second plate be superposed upon the rear end of the first plate, the latter at the time being fed through the press.

At the other side of the feeding rolls 108, and below the line of travel of the plate A so as to pass into the latter when free to do so, is an anti-friction roller 166, mounted in the free end of an arm 165, keyed to a stud shaft 164, to which is fixed also a bevel pinion 163. This pinion engages a like pinion 162 on the end of shaft 161, which is mounted at one end in a bearing upon the slide 237. A crank arm 160, splined upon the shaft 161, is connected by a link 159 to one arm of a bell crank 157—158, the other arm of which is connected by link 156, to a rod 154, movable longitudinally in the extension frame $f^2$. Vertical standards $f^3$ on the frame $f^2$ are connected by sections $f^4$, $f^4$, and bored to receive sliding pins 150, 151, having rollers 148, 149, which at times engage alternately and at opposite points thereon, the intermittingly operated cam 147. At their outer ends the sliding pins are connected to the upper ends of levers 152, 153, pivoted at a point intermediate their ends to the standards $f^4$. The lower ends of the levers 152, 153, are connected to the rod 154. An expansion spring 155 is confined about the rod 154, and tends normally to hold the roller 149 in, and the roller 148 out of, engagement with the cam 147.

The anti-friction roller 166 on the arm 165, will be depressed by the plate A resting thereon and passing thereover, and through the connections just described will engage the roller 148 with the cam 147, and at the same time effect the withdrawal of the roller 149 from its engagement with the said cam. The cam 147 is provided on its periphery with an inclined rib which by engaging the roller 148, shifts the clutch so as to separate the clutch faces 145 and 146, and permit the crank 141 to rest in a position at the end of its throw, Fig. 3, the crank being held in such position by the friction brake 141, until the clutch face 146 is shifted laterally to again engage the clutch face 145 of gear 144. During the time that the plate A by bearing upon the roller 166 holds the clutch faces separated, the roller 148 will engage the cam 147, and the eccentrically mounted rollers 11 and 11$^b$, will be in their uppermost plane, so that a second sheet A will not be fed forward by the constantly driven rollers 10.

When the first sheet A passes over and clears the roller 166, the expansion spring 155 will act to withdraw the roller 148 from its engagement with the cam and at the same time slide the roller 149 into the path of travel of the cam. In the time intervening between the withdrawal of roller 148 and the insertion of roller 149 in the path of the cam 147, the springs 147' will move the cam and its clutch face 146 along the crank shaft and into engagement with the clutch face 145 of the gear wheel 144. Thus will be imparted to the crank 141, a throw in the opposite direction, and the crank will come to a rest at the end of such throw in which position it will be held by the friction brake 142. This second movement of the crank will reverse the positions of the eccentrically mounted bearings of the rollers so that the rollers 11 will be lowered and the metal sheet supported by them be permitted to engage the surfaces of the driven rollers 10, to be carried between the guiding and feeding rolls 108.

The hubs of the arms 130 and 160 are housed in bearings on the frame F of the press, and are splined on the shafts 131 and 161, so that the said shafts may have longitudinal movement through the hubs when the slide 237 is moved to adjust its position on the frame F.

The shafts 107 carrying the guiding and feed rolls 108, are operated in unison by intermeshing gears 106, mounted on the ends thereof. The said rolls 108 have an intermitting rotary movement imparted to them through connections with a pawl and ratchet device, which connections I will now describe.

A bracket 62, Fig. 2, is attached to one side of the frame of the blanking press. A crank 60 having a radially adjustable crank pin, is carried upon one end of the shaft 37. A lever 61, centrally mounted upon the bracket 62, is oscillated by the crank, and is connected at its other end by a link 63 to an arm 64 of a casing 65, mounted to oscillate on a shaft 68. Attached to and inclosed by the casing is a series of pawls 67, pressed by springs 68, into engagement with the teeth of a ratchet wheel 66, inclosed also by the casing 65, and rotating with the shaft 68. The shaft 68 carries also a fixed gear wheel 69, meshing with a gear 70, mounted upon a short shaft journaled in the frame, the said shaft carrying also a bevel gear 71, engaging a like gear 72, fixed to the longitudinal shaft 73. This latter shaft has fixed upon one end a bevel gear 74, which meshes with a like gear 75, fixed to the lower end of a shaft 76, journaled in brackets attached to the frame F, and carrying at its upper end a bevel gear 77. In the arrangement shown in Fig. 11, the shaft 76 is disposed in an inclined position in the machine.

The bevel gear 77, meshes with a bevel gear 78 at one end of a shaft 79, the other end of which shaft carries a like gear 80, engaging a bevel gear 81, on the end of the lower shaft 107, which carries the feeding rolls 108.

By adjusting the throw of the crank 60, the rolls 108 may be caused to feed a plate A into the blanking press the exact distance required, and so avoid any needless waste of material.

The intermeshing of the pairs of gears 106 on the ends of shafts 107, will not be interfered with by the slight adjustment of the rolls 108, sometimes necessitated by different gages of plates A.

The blanking press comprises a bed B, upon which is mounted the hollow die $b^1$, and a reciprocating head C, carrying the punching die $c^1$, the head being attached to the cross head 215, the die members having the configuration necessary to punch out of the metal sheet A, a cross bar blank of the desired shape.

It is necessary that the sheet A be exactly positioned with relation to the dies $b^1$ and $c^1$, and that the last end of the sheet then being fed through the press have remaining a sufficient length to enable a cross bar blank to be punched out. To ascertain whether the sheet A is correctly positioned in the press for the first punching operation thereon, I have provided a forward feeler 171, to determine the advanced position of the plate, and a rear feeler 170, to determine whether there remains in the plate sufficient material to enable the press to produce another complete blank.

A longitudinal, undercut slot $d$ is provided at one side of the top of the frame F. Adjustably mounted upon the frame, and anchored in this slot, are two standards $d^1$ and $d^2$. This provision for adjustment is to enable the standard $d^2$ to be moved so that the forward feeler mounted thereon may be positioned to ascertain whether the plate A has been sufficiently advanced for the first punching operation, and also to enable the standard $d^1$ to be moved with relation to the standard $d^2$, so that the rear feeler mounted on the standard $d^1$ may be in position to ascertain whether there remains in the sheet A, sufficient material for another blank.

Figure 1:
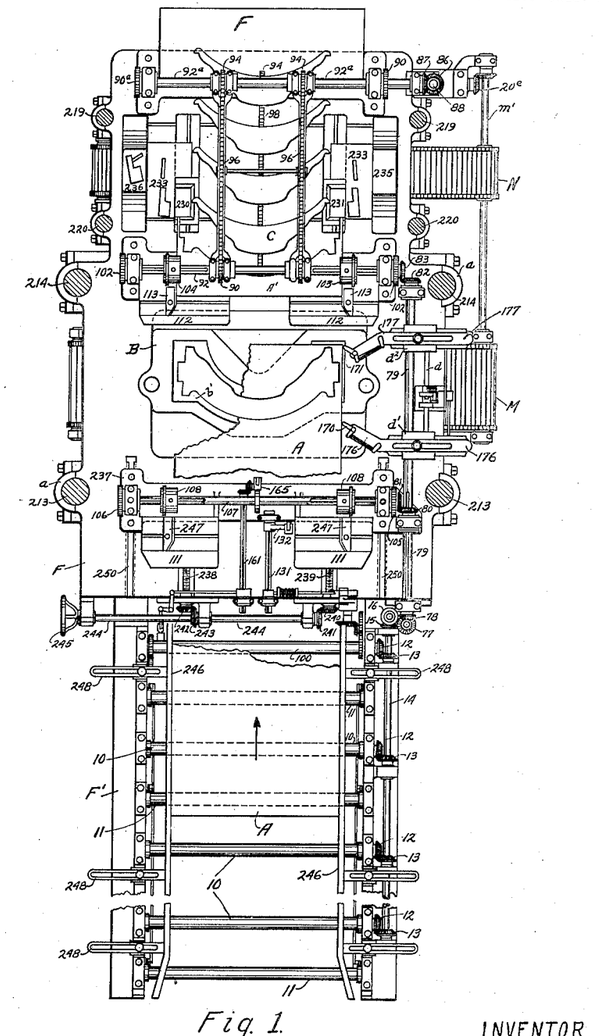
Figure 1 is a plan view in the plane of the feeding and blanking mechanism of my improved press.
Figure 8:
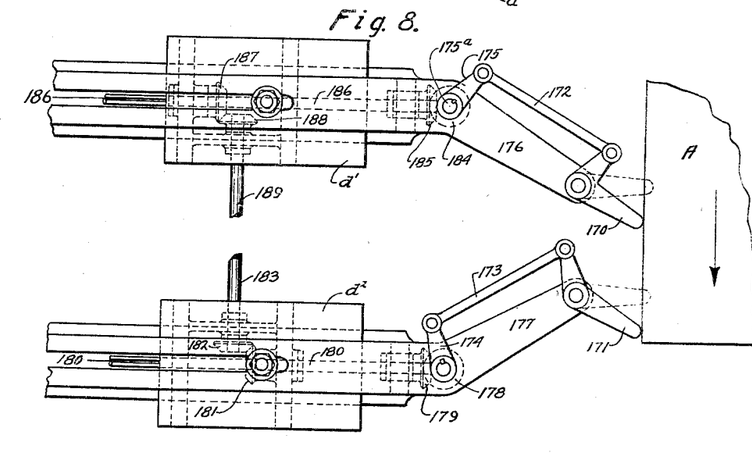
Figure 9:
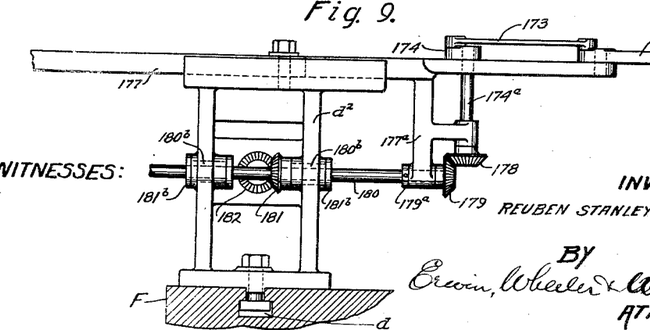

Slides 176 and 177, are adjustably mounted in cross slots in the said standards. The inner end of the slide 177, Figs. 1, and 8, is bent toward the front of the machine, and has pivoted thereon the feeler 171, composed of a two-armed lever, the free arm of which lies in the path of movement of the plate A through the blanking press. The other arm of this lever is connected by a link 173 to an arm 174, keyed to the upper end of a vertically disposed rock shaft $174^a$, journaled in the slide 177, and in a bearing $177^a$, depending therefrom. A splined shaft 180 is journaled in the standard $d^2$ and also in a bearing $177^a$ depending from the slide 177. The meeting ends of the shafts $174^a$ and 180, are connected by bevel gears 178 and 179, keyed upon their respective shafts. Longitudinal adjustment of the slide 177 will transmit like movement to the splined shaft 180, through its bearings in the standard $d^2$. A collar $179^a$ set upon the shaft 180 coöperates with the gear 179, to hold the shaft 180 against axial movement in its bearings $177^a$.

The bearings in the standard $d^2$, which receive the shaft 180, are formed as sleeves $180^b$, which are splined upon the said shaft. The said sleeves are journaled in the standard $d^2$, and rotate with the shaft, but their axial movement is prevented by collars or flanges $181^b$, on the ends of the sleeve bearings, which bear against the sides of the standards. A bevel gear 181 is formed as a part of one of the sleeves, and by reason of the spline, oscillates with shaft 180.

Figure 6:
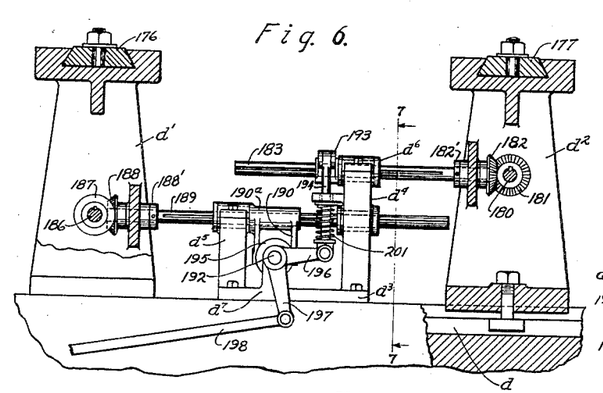
Figs. 6 to 9 show details of the construction and operation of the feeler devices for ascertaining the position of the metal sheet with relation to the punches of the press, Fig. 7 being a sectional view on the line 7—7, Fig. 6.
Figure 7:
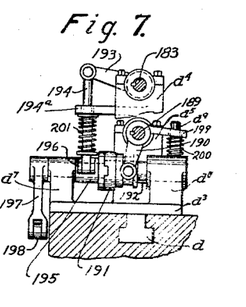

A stand $d^3$ having uprights $d^4$ and $d^5$, is arranged between the standards $d^1$, $d^2$, and may be secured in adjusted position by means of the slot $d$, Figs. 6 and 7. A splined shaft 183 is journaled at one end in a bearing in the standard $d^2$, and is carried at its other end in an oscillating sleeve bearing $d^6$, journaled in the upright $d^4$. Bevel gears 181 and 182, connect the ends of the shafts 180 and 183.

The inner end of the slide 176 is bent toward the rear of the machine, and has pivoted thereon the feeler 170, formed as a bell crank lever, and like the feeler 171, with its free arm in the path of movement of the plate A through the blanking press. The other arm of this lever is connected by a link 172 to an arm 175, keyed to the upper end of a verticaly disposed shaft $175^a$, journaled in the slide 176, and connected to a splined shaft 189, through a train of gearing like that just described in connection with the feeler 171, the vertical shaft $174^a$, and the splined shaft 183. The bevel gears 184 and 185, shaft 186, and bevel gears 187 and 188, Figs. 6 and 8, form parts of the connections referred to.

The splined shaft 189, is mounted in the standard $d^1$, just as the splined shaft 183 is mounted in the standard $d^2$. The splined shaft 189, is supported by both of the uprights $d^4$ and $d^5$, of the stand $d^3$, by oscillating sleeve bearings splined upon the shaft 189, in the manner hereinbefore described. In the longitudinal adjustment of the standards $d^1$ and $d^2$, the splined shafts 183 and 189 will slide through their splined sleeve bearings in the uprights $d^4$ and $d^5$, and the said bearings will be restrained from axial movement with the shafts, as will be understood. The shafts 183 and 189 are held from independent longitudinal movement by the gears 182, 188, on one side, and collars 182', 188', on the other side of the bearings in the standards $d^2$, respectively, during the adjustment of the said standards.

The stand $d^3$ also is provided with bearings $d^7$ and $d^8$, in which are mounted a short rock shaft 192. This shaft carries a fixed clutch member 195, and also a splined clutch member 191. A post $d^9$ is attached to the bearing $d^8$, and is encircled by an expansion spring 200, the normal tendency of which is to separate the clutch members 191 and 195, the spring acting through the arm 199 and clutch shifting yoke 190, of the clutch shifting member $190^a$, splined upon the shaft 189, and formed as one part with the sleeve mounted in the bearing $d^5$.

Splined upon the shaft 183, and formed as one part with the sleeve bearing $d^6$ in the upright $d^4$, is an arm 193, the free end of which is connected by a push rod 194, to an arm 196, which latter is formed with and extends from the clutch member 195, fixed to the shaft 192. The push rod 194, is guided by the perforated bracket $194^a$, extending from the upright $d^4$. An expansion spring is confined about the push rod 194, and is compressed between the said bracket and a head upon the lower end of the said push rod, the tendency of the spring being to rotate the clutch shaft 192, in the direction of the arrow, Fig. 6.

The rock shaft 192, has attached at one end an arm 197, connected by a link 198, to a bell crank 202, pivoted on the frame, the other arm of which bell crank is connected to a rod 203, extending to and connected at its other end with an arm 204, on the rock shaft 56. An arm 205, on the other end of the shaft 56, is connected to a slide $206^a$, Fig. 11, arranged and operating in the manner hereinbefore described with reference to the slide 154, Fig. 5. Through like connection, the slide 206$^a$, operates sliding pins having at their ends the rollers 206$^b$ and 206$^c$ coacting with a cam 206$^d$, formed with a clutch member splined upon a crank shaft like the cam 147 and clutch member 146. The said crank shaft has loosely mounted thereon a gear 54, which has on the side thereof a clutch member engaging the clutch and cam member 206$^d$ splined on the crank shaft, Fig. 10. The gear 54 meshes with a gear 55, fixed to the shaft 20, before referred to. The last mentioned cam shaft is also provided with a friction brake, to prevent overrunning of the crank 53, as in Fig. 3.

The crank 53 is connected by a link 52 to an arm 48$^a$, fixed to a rock shaft 49, mounted in bracket depending from the frame.

As previously stated herein, the gear 38 is loose upon the shaft 39, and another gear 38$^a$ is likewise loosely mounted upon the said shaft, the gears being arranged in pairs, so as to distribute the strains in driving. The shaft 39 is stepped for the reception of gear 38, and bushings 38$^b$ and 38$^c$ are inserted about the shaft and in the bore of the gear 38, the bushing 38$^c$ being flanged to take the wear of the hub of the gear from the frame of the machine.

Splined upon the said shaft 39, and between the said gears is arranged a duplex clutch, through which motion is transmitted to the shaft 39, when the said gears are engaged by the clutch. The opposing faces of the gears are formed with clutch faces 40, which are engaged by corresponding clutch members 41, of the duplex clutch, and the said clutch members are moved into and out of engagement with the clutch faces of the gears by means of toggles 44 and 45, at each side of the clutch.

Figure 11:
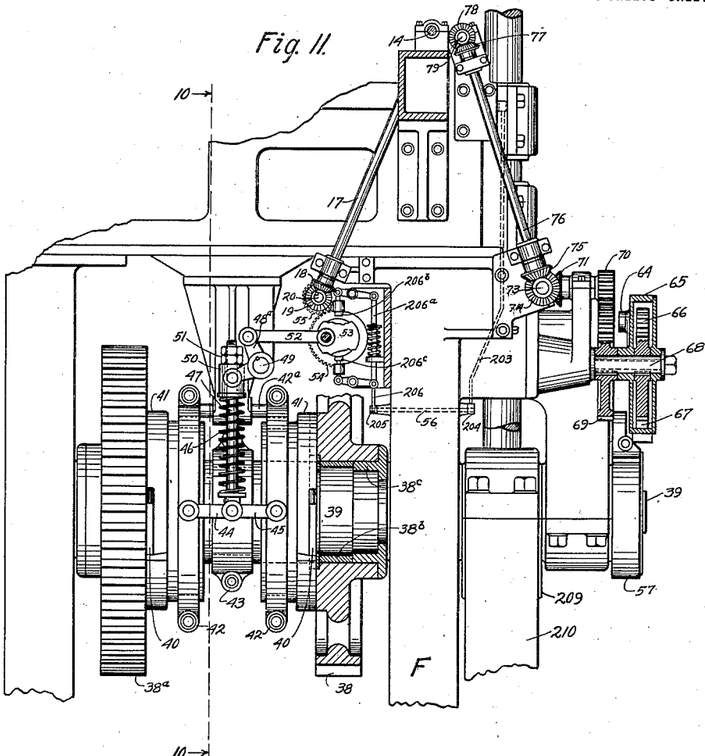
Fig. 11 is a view in elevation with parts in section from the right of Fig. 10, showing among other details the arrangement of the driving clutch and its operating mechanism, the view being in the direction of the arrow, Fig. 2.
Figure 13:
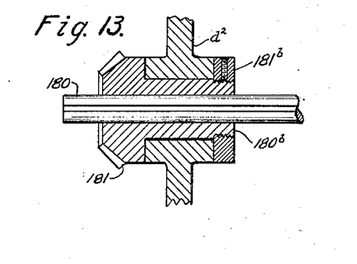
Fig. 13 is a sectional view showing the construction of the hubs formed as sleeve bearings for the splined shafts which pass therethrough.

The shaft 49, Figs. 10 and 11, has fixed thereon two arms 48, each of which is forked at its free ends to receive a pivoted head 50, through a bore in which is passed loosely a rod 47, upon the threaded end of which are jam nuts 47$^a$. The other end of the rod 47, is connected to the toggles 44 and 45. An expansion spring 46, encircles the rod 47, and is confined between the head 50 and a collar on the rod 47. The arms 48, through the springs 46, act to straighten the toggles and so engage the clutch members 41 with the clutch faces 40 of the gears 38 and 38$^a$. The toggles are broken by the arms 48 elevating the rods 47. A collar 43, formed as a split ring, is secured about the shaft 39, to act as a resistance to the movement of one of the clutch members 40, should the other clutch member fail for the moment to be disengaged from its coöperating gear.

The hubs of the clutch members 41, are circumferentially grooved for the reception of split rings 42, to which the toggles 44 and 45, are directly connected. The said rings slide upon a guiding pin 42$^a$ supported in a bracket depending from the frame.

The presence of a metal sheet A in position between the dies of the blanking press will cause the feeler 170 to assume the full line position shown in Fig. 8. When the feeler is so positioned the cam 190 of the rock shaft 189, will stand in the position indicated in Fig. 7, and the clutch members 191 and 195 will be in operative engagement, the spring 200 being compressed at this time. Movement of the feeler 170 to its dotted line position, under the influence of the expansion spring 200, in the absence of a plate A, will turn the arm 190 to the right, Fig. 7, and separate the clutch members.

Likewise, the presence of a metal sheet will cause the feeler 171, to assume its full line position, Fig. 8. When the feeler is so positioned, the spring 201 will be compressed, and the arm 193 of the rock shaft 183, will stand in its elevated position, Fig. 7, with the clutch members of the cam 206$^d$ held out of engagement with the clutch member formed on the side of the constantly rotating gear 54, Fig. 10. The crank 53, has made a throw to the left, and rests in the position shown in Fig. 11, with the toggles 44 and 45 straightened, and the clutch members 40 in engagement with the clutch members 41, of the gears 38 and 38$^a$. Movement of the feeler 171 to its dotted line position, Fig. 8, in the absence of a sheet A, and under the influence of the expansion spring 201, will through the connections described, impart a vertical movement to the slide 206$^a$, Fig. 11. This movement of the slide 206$^a$ will release the cam 206$^d$ to the influence of its actuating springs, whereby it will engage for the moment its clutch face with the clutch face of gear 54, and impart a throw to the crank 53, to the right. During the latter part of this crank movement, the cam action will separate the clutch faces 40 and 41 and the crank will remain at rest, at the right, Fig. 11.

Through the connections described, the toggles will be broken by the throw of the crank 53, and the clutch faces, 40 and 41 separated, thus allowing the gears 38 and 38$^a$ to run idly on the shaft 39, and disconnecting the punching devices from their actuating means, whereby the operation of the punching devices is suspended for the time being. The blanking press will therefore remain inactive until a sheet A has been fed thereto by the feed rolls 108, and the position of the sheet with relation to the punching dies has been accurately determined. The movement of the advancing end of sheet will turn the feeler 170 into its full line position, Fig. 8, and thus rock the shaft 189, causing the clutch members 181, 185, to become engaged. In its further advancing movement the sheet will turn the feeler 171 into its full line position, rock the shaft 183, pull upon the connecting link 198, shift the slide 206$^a$, and permit the crank 53 to make a throw to the left, to straighten the toggle and engage the clutches with the gears 38 and 38$^a$, to start the blanking press. The press will continue to operate so long as the sheet A presents material sufficient to produce a complete cross bar blank.

Following each operation of the blanking press, the sheet A is advanced to a scrap-cutting press, by the operation of which the scrap material remaining in the sheet A is reduced, without any manual handling or labor. The main frame F supports a bed, upon which are positioned the lower cutters 231. The upper cutters 232, are carried by a reciprocating cross head 221, mounted upon the upper ends of straining rods 219 and 220, supported in guide boxes $a^2$, attached to the frame. A cross head 218, connects the lower ends of the straining rods, and pivoted to the cross head 218, at each side of the machine, is a pitman 217, operated by eccentrics mounted upon the shaft 37, whereby continuous vertical reciprocation is imparted to the upper cutter head and its cutters 232. Traveling belt conveyers M and N, pass from left to right through the machine, below the beds of the blanking and scrap cutting presses.

The conveyer M is designed to deliver at the right hand side of the machine, the finished cross bar blanks, following the punching operations of the blanking press. These blanks may be delivered by the conveyer to devices which will feed them to another press, whereby they will be given the shape necessary to their use in connection with the purpose for which they were designed.

The conveyer N is designed to deliver at some point away from the machine, the small pieces resulting from the reduction of the scrap remaining in the sheet A after the blanking operations have been completed. These small pieces of scrap result from the action of the scrap cutters upon the side margins of the sheet, there being but little of the material at this point to be reduced, inasmuch as the length of the cross bar blank approximates closely the width of the metal sheet A. After passing through the scrap cutting press, the small pieces of scrap fall away from the cutters and are deflected by aprons 233, through openings 234, in the top of the frame, and into the path of travel of the conveyer N, upon which they are received and conveyed to the side of the machine, from which point the scrap may be further conveyed by mechanical means to a distant place of storage or to a railway car for shipment.

The configuration of the side bar blanks is such that considerable areas of usable scrap, remain in the sheet after the side bar blanks have been punched, these areas alternating in the sheet with the spaces, from which the blanks have been punched. The marginal cutting above described releases these pieces of usable scrap, and such pieces are delivered by chain belts to a point at the rear of the machine, Fig. 1.

The belt conveyers M and N are passed about drums arranged at opposite sides of the machine, Fig. 1. The drums at the left are journaled in bearings in the main frame, and the drums at the right are mounted upon a shaft $m^1$, likewise journaled, and through the rotation of which shaft and drums, the conveyers are driven. Motion is imparted to the shaft $m^1$ from the shaft 20, by means of connecting shafts 20$^a$ and 20$^b$, and intermeshing bevel gears 20$^c$, 20$^d$ and 20$^e$, connecting the four shafts mentioned.

At the rear of the machine, and in a horizontal plane, are parallel shafts 92 and 92$^a$, around which pass the upper chain conveyers 96. Similarly arranged shafts 82 and 82$^a$, in a plane below the shafts 92 and 92$^a$, drive the lower chain conveyers 98. All of the shafts are provided with sprockets, indicated at 94 in Fig. 1, which engage and move the chains when the shafts are rotated.

The shaft 79, which has previously been described as actuating the feeding rolls 108, has fixed upon its other end a bevel gear 79$^a$, which meshes with a like gear upon the lower chain conveyer shaft 82. Gears 101 are keyed upon the ends of shaft 82, and these gears mesh with like gears 102, upon the ends of shafts 92, whereby the said shafts are driven in unison, to actuate the chain conveyers passed about them, but in addition, I have provided other means supplemental to that described for driving the chain conveyers.

The shaft 73, Fig. 2, previously referred to, has at its other end a bevel gear 85, which engages a like gear 84, at the lower end of a vertically inclined shaft 88. This shaft 88 has fixed upon its upper end a bevel gear 86, which meshes with a like gear 87, keyed upon the shaft 82$^a$. The shafts 82$^a$ and 92$^a$, have at their ends inter-meshing gears 87$^a$ and 87$^b$, by which the said shafts are rotated in unison, in conjunction with the devices described in the next preceding paragraph, to actuate the chain conveyers to deliver the usable scrap from the machine.

In Fig. 1, tables 112, with marginal guides 113, adjustable thereon, are shown, the purpose of these tables and guides being to direct the sheet to the scrap cutting press, following the blanking operation. The shaft 92 is provided with flanged rolls 103, adjustable on the shaft, to feed the sheet into the chain conveyers and guide such sheet properly to the scrap cutting press.

In Fig. 1, a sheet A is shown as having passed through the blanking press, and into the cutting press, where it is being reduced to scrap. This figure shows also a second sheet A as being fed into the machine, and one side bar blank punched therefrom.

The various moving parts of the machine will be adjusted and regulated so that the desired synchronism will be attained, for the performance in sequence of the feeding and blanking operations. It will be understood that the scrap cutting press has no intermitting movement, but that it operates continuously, and that the step by step or intermitting feed of the plate after it has passed through the blanking press, will be such that the feeding movement of the skeleton of the plate into position for reduction will occur while the scrap cutters are separated for the moment.

The worm and gear shown conventionally in Fig. 2, are designed for the adjustment of the eccentric links 210, of the blanking press. Likewise, the train of gearing shown in connection with the eccentric links 217, of the scrapping press, is for a similar purpose.

Having thus described my invention, what I claim and desire to secure by Letters Patent is:—

1. In a press for punching cross bar blanks from sheet metal plates, the combination of a punching die and actuating means therefor, means for feeding the plate to the die, feeler devices for determining the area and position of the plate with relation to the die, and connections between the feeler devices and the die actuating means, for arresting the action of the die when a plate is improperly positioned.

2. In a press for punching cross bar blanks from sheet metal plate, the combination of a set of dies comprising a matrix and a punch, means for actuating the punch, means for feeding the plate between the dies, feeler devices for determining the area and position of the plate with relation to the dies, and devices controlled by the feeler devices for suspending the action of the punching die when a plate is not in position.

3. In a press for punching cross bar blanks from sheet metal plates, the combination of blanking dies, one of which is movable, operative means therefor, feeler devices for determining the area and position of the plate and controlling the said operative means and maintaining the latter active by the presence of a plate between the dies.

4. In a press for punching cross bar blanks from sheet metal plates, a die for producing the blanks, means for feeding the plates to the die, and devices for conveying the blanks from the press, in combination with a second die for cutting the skeleton into scrap, and devices for conveying the scrap from the press.

5. An intermittingly operating blanking press having dies for producing cross bar blanks from metal plates, combined with a continuously operating cutting press having dies for reducing the skeleton to scrap, and means for feeding the plates from press to press for successive action by the said dies.

6. An intermittingly operating blanking press having dies for producing cross bar blanks from metal plates, combined with a continuously operating cutting press having dies for reducing the skeleton to scrap, means for feeding the plates from press to press for successive action by the said dies, and feeler devices contacting with a plate between the blanking dies for maintaining the blanking press in operation.

7. In a press for punching cross bar blanks from sheet metal plates, the combination of a set of blanking dies, means for feeding the plates to the dies, feeler devices adjusted to determine the width of the plate presented to the dies, and connections from the feeler devices to control the action of the blanking dies.

8. An intermittingly operating blanking press having dies for producing cross bar blanks from metal plates, combined with a continuously operating cutting press having dies for reducing the skeleton to scrap, means for feeding the plates from press to press for the action of said dies, and means for operating the said presses in the time relation described.

9. An intermittingly operating blanking press having dies for producing cross bar blanks from metal plates, combined with a continuously operating cutting press having dies for reducing the skeleton to scrap, means for feeding the plates from press to press for the action of said dies, means for actuating the blanking press intermittingly, and means for actuating the scrap cutting press continuously.

10. A mechanism for feeding sheet metal plates to blanking presses, comprising driven feeding rollers, idle feeding rollers, a feeler actuated by the movement of a plate, and connections from the feeler to lift the idle rollers and suspend the feeding operation.

11. A mechanism for feeding sheet metal plates to blanking presses, comprising driven feeding rollers, idle feeding rollers mounted in eccentric bearings, a feeler actuated by the movement of a plate, and connections to the eccentric bearings to lift the idle rollers and suspend the feeding operation.

12. A mechanism for feeding metal plates to blanking presses, comprising a pair of intermittingly rotating feeding rolls, a cam rotating in timed relation thereto, a feeler stop device intercepting the path of movement of the plate and withdrawn by the cam, and driven rollers for feeding the plate to the feed rolls.

13. In a press for punching cross-bar blanks from sheet metal plates, the combination of a punching die and actuating means therefor, feeler devices adapted to contact with the plate at separated points to determine the area and position of the plate with relation to the said punching die, and connections between the feeler devices and die actuating means, for maintaining the latter operative by the presence of a plate between the dies.

14. In a press for punching cross-bar blanks from sheet metal plates, the combination of relatively movable blanking dies, a plurality of feeler devices to measure the width of that portion of the sheet which is being fed to the dies, and connections therefrom to the die actuating means to render the latter inoperative when a plate is not properly positioned.

15. In a press for punching wide blanks from sheet metal plates, the combination of a punching die and actuating means therefor, means for feeding the plate for a punching operation thereon by the die, a plurality of feeler devices adapted to contact with the plate at separated points, to determine the sufficiency of the material in the plate to produce a blank, and connections between the feeler device and the die actuating means for arresting the operation of the die when the section of the plate presented is of insufficient width.

16. In a press for punching cross-bar blanks from sheet metal plates, the combination of a punching die and actuating means therefor, means for feeding the plate to the die for a punching operation thereon, a pivoted feeler finger standing normally in the path of movement of the plate toward the die, and connections from the said feeler finger to the die actuating mechanism, to arrest the operation of such actuating means when a plate is not properly positioned.

In testimony whereof, I have signed my name at Milwaukee, Wisconsin, this 3rd day of April, 1919.

R. STANLEY SMITH.

Witnesses:
 W. F. WOOLARD,
 LEVERETT C. WHEELER.